US010760646B2

(12) United States Patent
Harada et al.

(10) Patent No.: US 10,760,646 B2
(45) Date of Patent: Sep. 1, 2020

(54) V-RIBBED BELT AND METHOD FOR PRODUCING SAME

(71) Applicant: Mitsuboshi Belting Ltd., Kobe-shi, Hyogo (JP)

(72) Inventors: Masashi Harada, Hyogo (JP); Kohei Sugimura, Hyogo (JP); Shuhei Tanaka, Hyogo (JP)

(73) Assignee: Mitsuboshi Belting Ltd., Kobe-shi, Hyogo (JP)

( * ) Notice: Subject to any disclaimer, the term of this patent is extended or adjusted under 35 U.S.C. 154(b) by 281 days.

(21) Appl. No.: 15/938,171

(22) PCT Filed: Sep. 23, 2016

(86) PCT No.: PCT/JP2016/078106
§ 371 (c)(1),
(2) Date: Mar. 28, 2018

(87) PCT Pub. No.: WO2017/057202
PCT Pub. Date: Apr. 6, 2017

(65) Prior Publication Data
US 2018/0223953 A1 Aug. 9, 2018

(30) Foreign Application Priority Data

Sep. 29, 2015 (JP) .................. 2015-191401
Sep. 8, 2016 (JP) .................. 2016-175415

(51) Int. Cl.
*F16G 5/20* (2006.01)
*B29D 29/10* (2006.01)
(Continued)

(52) U.S. Cl.
CPC ................ *F16G 5/20* (2013.01); *B29C 70/30* (2013.01); *B29C 70/54* (2013.01); *B29D 29/10* (2013.01);
(Continued)

(58) Field of Classification Search
CPC ..... F16G 5/20; F16G 5/06; F16G 1/28; C08L 23/16; C08L 2666/02
(Continued)

(56) References Cited

U.S. PATENT DOCUMENTS 4,936,814 A * 6/1990 Colley .................... B29C 70/14
474/263
5,308,291 A * 5/1994 Robertson ................. F16G 1/28
474/205
(Continued)

FOREIGN PATENT DOCUMENTS

CN      1726356 A     1/2006
EP      0746704 B1    5/1998
(Continued)

OTHER PUBLICATIONS

Sep. 5, 2018—(JP) Notification of Reasons for Refusal—App 2016-175415, Eng Tran.
(Continued)

*Primary Examiner* — Henry Y Liu
(74) *Attorney, Agent, or Firm* — Banner & Witcoff, Ltd.

(57) ABSTRACT

A V-ribbed belt includes a compression rubber layer containing a vulcanizate of a rubber composition, a tension member, and a tension layer, and has a side part of the compression rubber layer being a ground surface coming into contact with pulleys, and a bottom part of the compression rubber layer being a non-ground surface not coming into contact with pulleys. The V-ribbed belt has, on a surface of the bottom part, a composite layer containing a fiber assembly and a vulcanizate. The fiber assembly contains a heat-resistant fiber which is not melted at a vulcanization temperature of the rubber composition and has a weight per
(Continued)

unit area of 25 g/m² or less. The vulcanizate of the rubber composition impregnated among fibers of the fiber assembly.

10 Claims, 3 Drawing Sheets

(51) Int. Cl.
*B29C 70/30* (2006.01)
*B29C 70/54* (2006.01)
*B32B 3/30* (2006.01)
*B32B 5/02* (2006.01)
*B32B 5/12* (2006.01)
*B32B 25/10* (2006.01)
*F16G 5/08* (2006.01)
*B29K 21/00* (2006.01)

(52) U.S. Cl.
CPC ............... *B32B 3/30* (2013.01); *B32B 5/022* (2013.01); *B32B 5/12* (2013.01); *B32B 25/10* (2013.01); *F16G 5/08* (2013.01); *B29K 2021/00* (2013.01); *B29K 2995/0097* (2013.01); *B32B 2250/02* (2013.01); *B32B 2260/021* (2013.01); *B32B 2260/048* (2013.01); *B32B 2262/0276* (2013.01); *B32B 2305/22* (2013.01); *B32B 2307/306* (2013.01); *B32B 2433/04* (2013.01); *Y02W 30/68* (2015.05)

(58) Field of Classification Search
USPC .......................... 474/238, 260, 263
See application file for complete search history.

(56) References Cited

U.S. PATENT DOCUMENTS

| | | | |
|---|---|---|---|
| 6,695,733 B2 | 2/2004 | Knutson | |
| 6,872,159 B2 | 3/2005 | Knutson | |
| 6,945,891 B2 | 9/2005 | Knutson | |
| 7,863,364 B2* | 1/2011 | Westwood | C08L 23/0815 524/397 |
| 7,901,313 B2 | 3/2011 | Shiriike | |
| 8,426,524 B2* | 4/2013 | Piccirilli | C08L 9/02 474/202 |
| 2001/0036558 A1* | 11/2001 | Lewtas | B32B 27/32 428/521 |
| 2002/0132692 A1* | 9/2002 | Knutson | F16G 5/06 474/263 |
| 2003/0087715 A1* | 5/2003 | Fujimoto | F16G 5/20 474/237 |
| 2003/0130077 A1* | 7/2003 | Knutson | F16G 1/08 474/260 |
| 2004/0018906 A1* | 1/2004 | Sedlacek | F16G 1/28 474/260 |
| 2004/0132571 A1 | 7/2004 | Knutson | |
| 2004/0214674 A1* | 10/2004 | Tachibana | F16G 5/06 474/237 |
| 2004/0214676 A1* | 10/2004 | Shiriike | F16G 5/06 474/260 |
| 2005/0143209 A1* | 6/2005 | Shibutani | F16G 5/20 474/260 |
| 2007/0244263 A1* | 10/2007 | Burrowes | F16G 5/06 525/326.1 |
| 2007/0249450 A1* | 10/2007 | Shiriike | F16G 5/20 474/260 |
| 2008/0207371 A1* | 8/2008 | Dieudonne | F16G 5/06 474/263 |
| 2009/0186733 A1* | 7/2009 | Fujiwara | C08K 5/14 474/264 |
| 2011/0241269 A1* | 10/2011 | Siffer | C08J 7/18 267/113 |
| 2014/0323257 A1* | 10/2014 | Gibson | F16G 5/20 474/261 |
| 2014/0378255 A1* | 12/2014 | Gibson | B29D 29/08 474/263 |

FOREIGN PATENT DOCUMENTS

| | | |
|---|---|---|
| JP | H08-502574 A | 3/1996 |
| JP | 2005-069358 A | 3/2005 |
| JP | 2005-533983 A | 11/2005 |
| JP | 2009-533606 A | 9/2009 |
| WO | 94/09288 A1 | 4/1994 |

OTHER PUBLICATIONS

Dec. 20, 2016—International Search Report—Intl App PCT/JP2016/078106.
Mar. 1, 2019—(CN) Notification of First Office Action—App 201680056698.6, Eng Tran.
Apr. 3, 2019—(EP) Extended Search Report—App 16851376.0.
Jun. 24, 2020—(IN) Examination Report—App 201817009753.

* cited by examiner

V-RIBBED BELT AND METHOD FOR PRODUCING SAME

CROSS REFERENCE TO RELATED APPLICATIONS

This is a U.S. National Phase Application under 35 U.S.C. § 371 of International Application No. PCT/JP2016/078106, filed Sep. 23, 2016, which claims priority to Japanese Applicatoin Nos. 2015-191401 filed Sep. 29, 2015 and 2016-175415 filed Sep. 8, 2016, which was published Under PCT Article 21(2), the entire contents of which are incorporated herein by reference.

TECHNICAL FIELD

The present invention relates to a V-ribbed belt which is used for drive of automobile engine auxiliary machines and so on, and in detail, the present invention relates to a V-ribbed belt capable of reducing the grinding amount in a method of forming a rib part by grinding and being excellent in appearance and durability and a production method of the same.

BACKGROUND ART

In the field of rubber industry, especially, automobile components are desired to have advanced function and high performance. A V-ribbed belt in which ribs are provided along a belt longitudinal direction is one of rubber products to be used in such automobile components, and this V-ribbed belt is widely used for, for example, power transmission of auxiliary drive of automobile air compressors, alternators, and the like.

As a production method of a V-ribbed belt, there is known a production method of a rib part (compression rubber layer) in an inverted trapezoidal sectional shape by grinding. Specifically, in a production process of a V-ribbed belt, first of all, a belt sleeve in which respective molding members (e.g., an outside fabric, an unvulcanized rubber sheet, a cord, etc.) are wound around the outer peripheral surface of a cylindrical die and laminated is formed. In general, as for the belt sleeve, a sleeve is formed such that a ground surface (compression rubber layer which forms ribs) is faced on an outer peripheral side, whereas a belt back surface is faced on an inner peripheral side. Subsequently, the belt sleeve is disposed within a vulcanizer in a state where a vulcanizing jacket is put on the outer peripheral side of the belt sleeve, followed by undergoing vulcanization. In vulcanization of the belt sleeve, the vulcanization is conducted in a state where the outer peripheral surface of the belt sleeve is brought into contact with the inner peripheral surface of the vulcanizing jacket, and after the vulcanization, the vulcanizing jacket is removed (released). In addition, breathing (air bleeding) is necessary such that air (air bubble) does not build up in the belt sleeve during the vulcanization. In order to secure the releasability and breathability (air bleeding), there is adopted a method in which vulcanization is conducted in a state where a thick nonwoven fabric is wound on the outer peripheral surface of the sleeve, and after release, the nonwoven fabric is also ground and removed together with a ground site of the compressed rubber (method of grinding the entirety of rib parts).

In recent years, from a viewpoint of cost reduction, grappling with reduction of the material costs by reduction of the grinding amount (waste rubber amount) or by reduction of the belt thickness or the like is made. As for the reduction of the grinding amount (waste rubber amount), there is investigated a method in which the entirety of ribs is not ground, but only V-grooves (only side parts) are ground without grinding tip surfaces of the rib parts (bottom parts in an inverted trapezoidal shape). However, according to this method, the outer peripheral surface of the vulcanized belt sleeve becomes the rib tip surface as it is, and therefore, when a nonwoven fabric is used for the outer peripheral surface, the nonwoven fabric remains in the tip surface of rib part (rib tip surface).

As for the V-ribbed belt having a nonwoven fabric on the rib tip surface, for example, PTL 1 proposes that in order to suppress generation of abnormal sounds generated between the belt and the pulley or wear on the belt surface without using a short fiber-containing rubber, the rib rubber layer is constructed in a structure in which a rubber layer and a nonwoven layer are alternately laminated in a belt thickness direction and discloses a V-ribbed belt having the nonwoven layer on the rib tip surface of the rib rubber layer.

However, in this V-ribbed belt, since the rib rubber layer contains the plural nonwoven fabric layers, the belt becomes rigid, and therefore the bending properties of the belt are worsened (the nonwoven fabric cramps up, thereby disturbing bending) and the durability is worsened (a crack is liable to occur) in belt running. Furthermore, since the rib rubber layer is divided by the nonwoven fabric layer, delamination is liable to occur, too. Moreover, in this patent literature, in order to suppress abnormal sounds generated between the belt and the pulley and to suppress wear of the friction belt surface, the nonwoven fabric layer is introduced in place of a short fiber to be contained in the rubber, and problems in the grinding method are not described. In this patent literature, details of the nonwoven fabric layer, such as a weight per unit area, etc., are not described. In general, in V-ribbed belts having a nonwoven fabric on the rib tip surface, the outward appearance on the nonwoven fabric surface is worsened.

Meanwhile, if the production is conducted without using a nonwoven fabric, not only the releasability and breathability (air bleeding) become insufficient, but also the surface properties of the vulcanizing jacket are transferred onto the sleeve surface (rib tip surface), and for example, in the case of a vulcanizing jacket having a flaw on the surface thereof, the flaw is transferred, whereby the appearance is worsened.

In addition, PTL 2 discloses a V-ribbed belt having a thermoplastic resin layer (layer in a film-like form but not a fibrous form) on the rib tip surface. In this patent literature, it is described that after the thermoplastic resin layer is joined to the rib, the belt is cut and ground in a V-belt profile.

However, even in this V-ribbed belt, not only the breathability (air bleeding) is insufficient, but also the bending properties of the belt are worsened (the thermoplastic resin layer cramps up, thereby disturbing bending), and the durability is worsened (a crack is liable to be produced).

CITATION LIST

Patent Literature

PTL 1: JP-A-2005-69358
PTL 2: JP-A-2005-533983

SUMMARY OF INVENTION

Problems that the Invention is to Solve

In consequence, an object of the present invention is to provide a V-ribbed belt which can be formed by grinding a rib part in a small grinding amount (waste rubber amount) and in which a vulcanization step can be made to smoothly proceed and a production method of the same.

Another object of the present invention is to provide a V-ribbed belt which is excellent in an appearance and in which durability, such as crack resistance, heat resistance, etc., can also be improved and a production method of the same.

Still other object of the present invention is to provide a V-ribbed belt in which not only an adhesive treatment of a fiber assembly is not needed, but also even when a fiber is contained, winding workability can be improved and a production method of the same.

Means for Solving the Problems

In order to solve the above-described problem, the present inventors made extensive and intensive investigations. As a result, it has been found that when on a surface of a bottom part of a compression rubber layer of a V-ribbed belt in which a side part thereof is a ground surface coming into contact with pulleys, and a bottom part thereof is a non-ground surface not coming into contact with pulleys, a composite layer containing a fiber assembly that contains a heat-resistant fiber which is not melted at a vulcanization temperature of a rubber composition constituting the above-described compression rubber layer and that has a specified weight per unit area; and a vulcanizate of the above-described rubber composition impregnated among fibers of this fiber assembly is formed, not only a rib part can be formed in a small grinding amount (waste rubber amount), but also a vulcanization step can be made to smoothly proceed, thereby leading to accomplishment of the present invention.

A V-ribbed belt of the present invention includes a compression rubber layer containing a vulcanizate of a rubber composition, a tension member, and a tension layer, and has a side part of the compression rubber layer being a ground surface coming into contact with pulleys, and a bottom part of the compression rubber layer being a non-ground surface not coming into contact with pulleys, wherein the V-ribbed belt has, on a surface of the bottom part, a composite layer containing a fiber assembly that contains a heat-resistant fiber which is not melted at a vulcanization temperature of the rubber composition and that has a weight per unit area of 25 g/m$^2$ or less, and a vulcanizate of the rubber composition impregnated (penetrated or existent) among fibers of the fiber assembly. The heat-resistant fiber may contain a polyester fiber. The fiber assembly may have a nonwoven fiber structure. The weight per unit area of the fiber assembly may be about 8 to 20 g/m$^2$. The compression rubber layer may form a continuous phase with the vulcanizate of the rubber composition. The heat-resistant fiber may have an average fiber diameter of about 1 to 50 μm. The heat-resistant fiber may contain a long fiber. It is preferable that the heat-resistant fibers are not fused with each other. The compression rubber layer may contain a short fiber. In the fiber assembly (nonwoven fiber structure or nonwoven fabric) having a nonwoven fiber structure, the heat-resistant fiber may be oriented in a predetermined direction and a longitudinal direction of the heat-resistant fiber may be in parallel to a longitudinal direction of the belt. The compression rubber layer may have a rib part, and the rib part may have an average thickness of 54% or less relative to an average thickness of the entire V-ribbed belt.

The present invention further includes a production method of the V-ribbed belt, the method including: a tension layer attaching step of attaching a tension layer member for forming a tension layer in a cylindrical drum; a cord spinning step of winding a cord as a tension member; a compression rubber layer winding step of winding an unvulcanized rubber sheet for forming a compression rubber layer; a fiber assembly winding step of winding a fiber assembly containing a heat-resistant fiber on the wound unvulcanized rubber sheet; a vulcanization step of vulcanizing a belt molded body obtained by the foregoing respective steps to obtain a vulcanized belt sleeve; and a grinding step of grinding only a side part of the compression rubber layer on a fiber assembly side of the vulcanized belt sleeve to achieve molding. The fiber assembly may have an average thickness of 0.03 to 0.15 mm.

Advantage of the Invention

In the present invention, on a surface of a bottom part of a compression rubber layer of a V-ribbed belt in which a side part thereof is a ground surface coming into contact with pulleys, and a bottom part thereof is a non-ground surface not coming into contact with pulleys, a composite layer containing a fiber assembly containing a heat-resistant fiber which is not melted at a vulcanization temperature of a rubber composition constituting the above-described compression rubber layer and having a specified weight per unit area; and a vulcanizate of the above-described rubber composition impregnated among fibers of this fiber assembly is laminated, and therefore, grinding of the bottom part of the compression rubber layer is not needed, and the rib part can be formed in a small grinding amount (waste rubber amount). In addition, in a vulcanization step, the fiber assembly of a nonwoven fabric or the like is able to secure the releasability and breathability, and therefore, air bleeding at the time of vulcanization and release from a vulcanizing jacket can be made to smoothly proceed. For that reason, transfer of a flaw or a stain, etc. of the vulcanizing jacket can be suppressed. In addition, by selecting a specified fiber assembly having a nonwoven fiber structure, the rubber composition is appropriately embedded and included in the fibers, and therefore, fuzz of the fiber can be suppressed, and the appearance can be improved. In addition, the fiber is integrated with the vulcanizate of the rubber composition constituting the compression rubber layer only on the bottom part surface of the compression rubber layer, and therefore, the bending resistance of the belt is excellent, and the durability, such as crack resistance, etc., can be improved, and the heat resistance can also be held. Furthermore, the fiber assembly and the compression rubber layer are integrated with each other by vulcanization, and therefore, an adhesive treatment of the fiber assembly is not needed. In addition, by making the longitudinal direction of the heat-resistant fiber parallel to the longitudinal direction of the belt, even when the fiber is contained, elongation or breakage at the time of drawing the belt in the winding direction (circumferential direction) can be suppressed, and winding workability of the belt can be improved.

MODE FOR CARRYING OUT THE INVENTION

The V-ribbed belt of the present invention is formed in an approximately inverted trapezoidal shape in terms of a cross section by grinding and is provided with a compression rubber layer containing a vulcanizate of a rubber composition, and a side part of this compression rubber layer is a ground surface coming into contact with pulleys, and a bottom part of the above-described compression rubber layer is a non-ground surface not coming into contact with pulleys.

Figure 1:
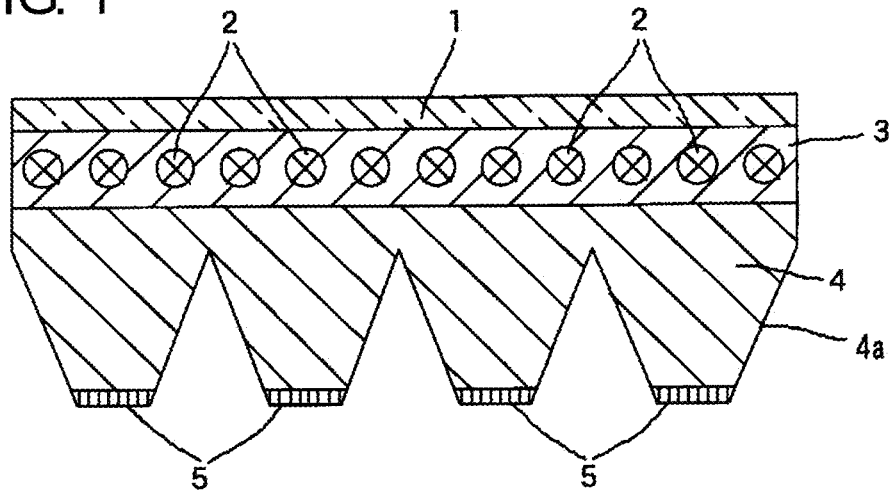
FIG. 1 is a schematic cross-sectional view showing an example of a V-ribbed belt of the present invention.

The form of the V-ribbed belt is not particularly limited so long as it is provided with such a compression rubber layer, and for example, a form shown in FIG. 1 is exemplified. FIG. 1 is a schematic cross-sectional view showing an example of the V-ribbed belt of the present invention. This form is a form in which a tension layer 1 constituted of an outside fabric (e.g., a woven fabric, a knitted fabric, a nonwoven fabric, etc.), an adhesive rubber layer 3 in which tension members (cords) 2 are embedded in the belt longitudinal direction, a compression rubber layer 4, and a composite layer 5 are laminated in this order from the belt upper surface (back surface) toward the belt lower surface (inner peripheral surface). In the compression rubber layer 4, a plurality of grooves having a V-shaped section and extending in the belt longitudinal direction are formed; a plurality of ribs (four ribs in the example shown in FIG. 1) having a V-shaped section [inverted trapezoidal shape (trapezoidal shape tapered toward the tip of the rib)] are formed between the grooves; and two inclined planes (surfaces) in each of the rib parts form friction transmission faces and come into contact with pulleys to transmit a power (frictional power transmission). In particular, in the present invention, the side face (inclined plane) of the above-described rib part is a ground surface 4a, and the composite layer 5 that is a non-ground surface is formed on the bottom part surface of the rib part.

The V-ribbed belt of the present invention is not limited to this form, and so long as it is provided with such a compression rubber layer, for example, the tension layer may be formed of a rubber composition, and tension members (cords) may be embedded between the tension layer and the compression rubber layer without providing the adhesive rubber layer. Furthermore, a form in which the adhesive rubber layer is provided in either the compression rubber layer or the tension layer, and the tension members (cords) are embedded between the adhesive rubber layer (on the compression rubber layer side) and the tension layer, or between the adhesive rubber layer (on the tension layer side) and the compression rubber layer, may also be adopted.

[Composite Layer]

The composite layer is formed without being ground in the bottom part of the compression rubber layer and contains a fiber assembly containing a heat-resistant fiber which is not melted at a vulcanization temperature of the rubber composition constituting the compression rubber layer, and a vulcanizate of the above-described rubber composition impregnated among fibers of this fiber assembly (gap between the fibers in the inside of the assembly).

(Fiber Assembly)

The fiber assembly has only to contain a heat-resistant fiber as a main fiber, and so long as the effect of the present invention is not impaired, it may also contain a non-heat-resistant fiber (for example, a polyolefin fiber, an acrylic fiber, a vinyl-based fiber, a styrene-based fiber, a polycarbonate-based fiber, a polyurethane fiber, a thermoplastic elastomer fiber, etc.). The proportion of the heat-resistant fiber is 50% by mass or more and may be, for example, 50 to 100% by mass, preferably 80 to 100% by mass, and 90 to 100% by mass or so relative to the whole of the fiber assembly, and it may also be 100% by mass (only the heat-resistant fiber).

The heat-resistant fiber has only to be a fiber which is not melted at a vulcanization temperature of the rubber composition constituting the compression rubber layer and may be any of an organic fiber and an inorganic fiber.

Examples of the organic fiber include a natural fiber (a cellulose-based fiber, e.g., a cotton fiber, a hemp fiber, a rayon fiber, etc., and the like); a synthetic fiber [an aliphatic polyamide fiber (e.g., a polyamide 6 fiber, a polyamide 66 fiber, a polyamide 46 fiber, etc.), a polyester fiber (e.g., a poly($C_2$-$C_4$)alkylene ($C_6$-$C_{14}$)arylate-based fiber, such as a polybutylene terephthalate fiber, a polyethylene terephthalate fiber, a polyethylene naphthalate fiber, etc.), a fluorine fiber (e.g., a polytetrafluoroethylene fiber, etc.), a poly-acrylic fiber (e.g., a polyacrylonitrile fiber, etc.), a polyvinyl alcohol fiber, a polyphenylene sulfide (PPS) fiber, a poly-p-phenylenebenzobisoxazole (PBO) fiber, an aromatic polyamide fiber (e.g., a p-aramid fiber, a m-aramid fiber, etc.), and the like]; and the like. Examples of the inorganic fiber include a carbon fiber, a glass fiber, a metal fiber, and the like. These heat-resistant fibers can be used either alone or in combination of two or more thereof. Of these heat-resistant fibers, from standpoints of high modulus of elasticity and excellent flexibility, an organic fiber, such as an aliphatic polyamide fiber (nylon fiber), an aromatic polyamide fiber (aramid fiber), a polyester fiber, a PBO fiber, etc., is preferred; and from a standpoint of an excellent balance between mechanical characteristics and heat resistance, a polyester fiber (especially, a poly($C_2$-$C_4$)alkylene ($C_6$-$C_{14}$)arylate-based fiber, such as a polyethylene terephthalate fiber, a polyethylene naphthalate fiber, etc.) is especially preferred. The heat-resistant fiber may also be, for example, a combination of a polyester fiber (e.g., a polyethylene terephthalate long fiber, etc.) that is a main fiber with a short fiber originated in the compression rubber layer (e.g., a cotton fiber, an aramid fiber, etc.).

In the case where the heat-resistant fiber is an organic fiber, in order to hold the fiber shape even after vulcanization, it may have a softening point or melting point higher than the vulcanization temperature (for example, 140 to 200° C. especially 180° C. or so), and when the vulcanization temperature is defined as T, the softening point or melting point (or decomposition point) of the heat-resistant fiber may be, for example. (T+10)° C. or higher and is, for example, (T+10) to (T+300)° C., preferably (T+20) to (T+200)° C., and more preferably (T+30) to (T+100)° C. or so. The melting point of the heat-resistant fiber may be, for example, 180 to 350° C., preferably 200 to 300° C., and more preferably 250 to 280° C. or so. When the softening point or melting point is equal to the vulcanization temperature or lower, there is a concern that the fiber shape vanishes due to vulcanization to form a film, and the bending resistance of the belt is worsened.

The fiber form of the heat-resistant fiber is not particularly limited, and it may be any form of a monofilament, a multifilament, or a spun yarn and may also be a combination thereof.

The average fiber diameter of the heat-resistant fiber is, for example, 1 to 50 µm, preferably 2 to 30 µm, and more preferably 3 to 10 µm (especially, 5 to 9 µm) or so. When the fiber diameter is too large, there is a concern that the flexibility is worsened, and the bending resistance of the belt is worsened, whereas when it is too small, there is a concern that the breathability in a belt production process is worsened.

The fiber length of the heat-resistant fiber is not particularly limited, and though the heat-resistant fiber may be a short fiber (short fiber having an average fiber length of, for example, about 1 to 500 mm, preferably about 3 to 300 mm, and more preferably about 5 to 100 mm), it is preferably a long fiber (long fiber having an infinite fiber length) from a standpoint of excellent form stability and so on. Furthermore, the heat-resistant fiber may also be a combination of a long fiber (e.g., a polyester long fiber, etc.) as a main fiber with a short fiber (e.g., a short fiber originated in the compression rubber layer) as an auxiliary fiber.

Though the structure of the fiber assembly may be a knitted/woven fiber structure (structure of knitted fabric or woven fabric), from a standpoint that the rubber composition is readily impregnated or penetrated among the fibers, a nonwoven fiber structure (structure of nonwoven fabric) is preferred. The nonwoven fiber structure in the present invention is in general a structure in which the rubber composition is filled (impregnated) among the fibers of the nonwoven fabric working as a raw material.

The weight per unit area of the fiber assembly may be 25 g/m$^2$ or less and is, for example, 5 to 25 g/m$^2$, preferably 7 to 23 g/m$^2$ (for example, 8 to 20 g/m$^2$), and more preferably 8 to 15 g/m$^2$ (especially, 8 to 12 g/m$^2$) or so. Furthermore, from a standpoint that a belt with high bending resistance can be stably produced, the weight per unit area may also be 6 to 11 g/m$^2$ (especially, 7 to 10 g/m$^2$) or so. When the weight per unit area is too small, there is a concern that the releasability and breathability are worsened in the belt production process, whereas when it is too large, there is a concern that integration with the rubber composition is impaired, or the bending resistance is worsened. The weight per unit area of the heat-resistant fiber assembly having a nonwoven fiber structure is the same as the weight per unit area of the nonwoven fabric working as a raw material.

As for the fiber assembly, though the fibers may be fused with each other, from a standpoint that the bending resistance can be improved, non-fused fibers (not having a fusion point) in which fibers (especially, heat-resistant fibers) are not fused with each other are preferred.

Though the heat-resistant fiber may be randomly oriented, from a standpoint that the strength against a specified direction can be improved, it is preferred that the heat-resistant fiber is oriented in a predetermined direction [e.g., a machine direction (MD) in the production process, etc.]. As for the fiber assembly (especially, the nonwoven fabric) in which the fiber is oriented in a predetermined direction, by making the longitudinal direction of the fiber parallel to the longitudinal direction of the belt, elongation or breakage at the time of drawing the belt in the winding direction (circumferential direction) can be suppressed, and winding workability of the belt can be improved.

If desired, the fiber assembly may contain a customary additive, for example, a reinforcing agent, a filler, a metal oxide, a plasticizer, a processing agent or processing aid, a coloring agent, a coupling agent, a stabilizer (e.g., a UV absorber, an antioxidant, an antiozonant, a heat stabilizer, etc.), a lubricant, a flame retarder, an antistatic agent, etc., in the fiber surface or inside each fiber. The proportion of the additive is about 10% by weight or less (for example, 0.1 to 5% by weight) relative to the entire fiber assembly.

(Vulcanizate of Rubber Composition)

The above-described rubber composition is a rubber composition in which the rubber composition of the compression rubber layer is penetrated (existent or contained) among the fibers of the fiber assembly. Though the rubber composition is not particularly limited, in general, a rubber composition containing a rubber component and a vulcanizer or a cross-linking agent is used. The present invention is useful especially for a case where an unvulcanized rubber layer is formed of a rubber composition containing sulfur and an organic peroxide (especially, an organic peroxide-vulcanized rubber composition), and the unvulcanized rubber layer is vulcanized or crosslinked.

Examples of the rubber component may include vulcanizable or crosslinkable rubbers, for example, a diene-based rubber (e.g., a natural rubber, an isoprene rubber, a butadiene rubber, a chloroprene rubber, a styrene butadiene rubber (SBR), an acrylonitrile butadiene rubber (nitrile rubber), a hydrogenated nitrile rubber, a mixed polymer of a hydrogenated nitrile rubber and an unsaturated carboxylic acid metal salt, etc.), an ethylene-α-olefin elastomer, a chlorosulfonated polyethylene rubber, an alkylated chlorosulfonated polyethylene rubber, an epichlorohydrin rubber, an acrylic rubber, a silicone rubber, a urethane rubber, a fluorine rubber, etc. These rubber components can be used either alone or in combination of two or more thereof.

Among those, an ethylene-α-olefin elastomer (ethylene-α-olefin-based rubber) is preferred from a standpoints that it is free from a noxious halogen, has ozone resistance, heat resistance, and cold resistance, and is excellent in economy. Furthermore, the ethylene-α-olefin elastomer is low in water wettability as compared with other rubbers, and therefore, the power transmission properties and quietness at the time of pouring water can be remarkably improved.

Examples of the ethylene-α-olefin elastomer (ethylene-α-olefin-based rubber) include an ethylene-α-olefin rubber, an ethylene-α-olefin-diene rubber, and the like.

Examples of the α-olefin include chain α-$(C_3$-$C_{12})$olefins, such as propylene, butene, pentene, methylpentene, hexene, octene, etc., and the like. The α-olefins can be used either alone or in combination of two or more thereof. Among these α-olefins, α-$(C_3$-$C_4)$olefins, such as propylene, etc. (especially, propylene) are preferred.

Examples of the diene monomer may include, in general, non-conjugated diene-based monomers, such as dicyclopentadiene, methylene norbornene, ethylidene norbornene, 1,4-hexadiene, cyclooctadiene, etc. These diene monomers can be either alone or in combination of two or more thereof.

Typical examples of the ethylene-α-olefin elastomer may include an ethylene-α-olefin rubber (ethylene-propylene rubber (EPR)), an ethylene-α-olefin-diene rubber (ethylene-propylene-diene copolymer (e.g., EPDM, etc.)), and the like. The ethylene-α-olefin elastomer is preferably EPDM.

In the ethylene-α-olefin rubber, the proportion (mass ratio) of ethylene and the α-olefin may be, the former/the latter=40/60 to 90/10, preferably 45/55 to 85/15 (for example, 50/50 to 82/18), and more preferably 55/45 to 80/20 (for example, 55/45 to 75/25) or so. In addition, the proportion of the diene can be selected within a range of from 4 to 15% by mass or so relative to the entire rubber, and for example, it may be 4.2 to 13% by mass (for example, 4.3 to 12% by mass), and preferably 4.4 to 11.5% by mass (for example, 4.5 to 11% by mass) or so. An iodine value of the ethylene-α-olefin rubber containing a diene component may be, for example, 3 to 40 (preferably 5 to 30, and more preferably 10 to 20) or so. When the iodine value is too small, the vulcanization of the rubber composition becomes insufficient, so that wear or adhesion is liable to be occurred. Conversely, when the iodine value is too large, scorch of the rubber composition becomes short, so that there is a tendency that not only the handling becomes difficult, but also the heat resistance is worsened.

Examples of the organic peroxide include organic peroxides which are usually used for crosslinking of rubbers or resins, for example, diacyl peroxides, peroxy esters, and dialkyl peroxides (for example, dicumyl peroxide, t-butyl-cumyl peroxide, 1,1-di-butylperoxy-3,3,5-trimethylcyclohexane, 2,5-dimethyl-2,5-di(t-butylperoxy)-hexane, 1,3-bis (t-butylperoxy-isopropyl)benzene, di-t-butyl peroxide, etc.), and the like. These organic peroxides can be used either alone or in combination of two or more thereof. Furthermore, the organic peroxide is preferably a peroxide in which a half-life of one minute by thermal decomposition is 150 to 250° C. (for example, 175 to 225° C.) or so.

The proportion of the vulcanizer or crosslinking agent (especially, an organic peroxide) is, in terms of a solid content and relative to 100 parts by mass of the rubber component (e.g., an ethylene-α-olefin elastomer, etc.), 1 to 10 parts by mass, preferably 1.2 to 8 parts by mass, and more preferably 1.5 to 6 parts by mass (especially, 2 to 5 parts by mass) or so.

The rubber composition may further contain a vulcanization accelerator. Examples of the vulcanization accelerator include a thiuram-based accelerator, a thiazole-based accelerator, a sulfenamide-based accelerator, a bismaleimide-based accelerator, a urea-based accelerator, and the like. These vulcanization accelerators can be used either alone or in combination of two or more thereof. The proportion of the vulcanization accelerator is, in terms of a solid content and relative to 100 parts by mass of the rubber component, for example, 0.5 to 15 parts by mass, preferably 1 to 10 parts by mass, and more preferably 2 to 5 parts by mass or so.

In order to increase a degree of crosslinking and to prevent adhesive wear, etc. the rubber composition may further contain a co-crosslinking agent (crosslinking aid or co-vulcanizer). Examples of the co-crosslinking agent include customary crosslinking aids, for example, a polyfunctional (iso)cyanurate [for example, triallyl isocyanurate (TAIC), triallyl cyanurate (TAC), etc.], a polydiene (for example, 1,2-polybutadiene, etc.), a metal salt of an unsaturated carboxylic acid [for example, zinc (meth)acrylate, magnesium (meth)acrylate, etc.], an oxime (for example, quinone dioxime, etc.), a guanidine (for example, diphenyl guanidine, etc.), a polyfunctional (meth)acrylate [for example, ethylene glycol di(meth)acrylate, butanediol di(meth)acrylate, trimethylolpropane tri(meth)acrylate, etc.], a bismaleimide (e.g., N,N'-m-phenylene bismaleimide, etc.), and the like. These crosslinking aids can be used either alone or in combination of two or more thereof. The proportion of the crosslinking aid (a total amount in the case of combining plural kinds) is, in terms of a solid content and relative to 100 parts by mass of the rubber, for example, 0.01 to 10 parts by mass, preferably 0.05 to 8 parts by mass, and more preferably 0.1 to 5 parts by mass or so.

If desired, the rubber composition may contain a customary additive, for example, a vulcanization aid, a vulcanization accelerator, a vulcanization retarder, a reinforcing agent (e.g., carbon black, a silicon oxide, such as hydrated silica, etc., etc.), a filler (e.g., clay, calcium carbonate, talc, mica, etc.), a metal oxide (for example, zinc oxide, magnesium oxide, calcium oxide, barium oxide, iron oxide, copper oxide, titanium oxide, aluminum oxide, etc.), a softening agent (e.g., an oil, such as a paraffin oil, a naphthene-based oil, a process oil, etc., etc.), a processing agent or processing aid (e.g., stearic acid, a stearic acid metal salt, a wax, a paraffin, a fatty acid amide, etc.), an anti-aging agent (e.g., an antioxidant, a thermal anti-aging agent, an antiflex-cracking agent, an antiozonant, etc.), a coloring agent, a tackifier, a plasticizer, a coupling agent (e.g., a silane coupling agent, etc.), a stabilizer (e.g., a UV stabilizer, a heat stabilizer, etc.), a lubricant, a flame retarder, an antistatic agent, etc. The metal oxide may also act as a crosslinking agent. These additives can be used either alone or in combination of two or more thereof.

The proportion of such an additive can be selected within a customary range according to the kind thereof. For example, the proportion of the reinforcing agent (e.g., carbon black, silica, etc.) may be 10 to 200 parts by mass (especially, 20 to 150 parts by mass) or so; the proportion of the metal oxide (e.g., zinc oxide, etc.) may be 1 to 15 parts by mass (especially, 2 to 10 parts by mass) or so; the proportion of the softening agent (e.g., an oil, such as a paraffin oil, etc.) may be 1 to 30 pats by mass (especially, 5 to 25 parts by mass) or so; and the proportion of the processing agent (e.g., stearic acid, etc.) may be 0.1 to 5 parts by mass (especially, 0.5 to 3 parts by mass) or so, relative to 100 parts by mass of the rubber component.

(Characteristics of Composite Layer)

In the present invention, the fiber assembly containing the heat-resistant fiber which is not melted by vulcanization of the rubber composition constituting the compression rubber layer is embedded in the surface of the compression rubber layer, to form the composite layer in which it is included (integrated) with the rubber composition. Therefore, the flexibility of the fiber can be held; the fiber assembly does not become harm (bracing) in bending of the belt; the durability of the belt can be improved; fuzz in the bottom part of the compression rubber layer can be suppressed; and the appearance properties are not impaired. Furthermore, as for the composite layer, the fiber shape does not vanish and remains in the vulcanization step, and therefore, the releasability and breathability in the vulcanization step as well as the durability can be secured due to the fiber shape.

As for the existence form of the heat-resistant fiber in the composite layer, in order to secure the releasability and breathability in the vulcanization step, it is preferred that at least a part of the heat-resistant fiber is exposed out of the surface of the composite layer, and other parts of the heat-resistant fiber may be embedded in the rubber composition impregnated among the fibers in the inside of the composite layer. In addition, when the majority of the heat-resistant fiber is embedded in the rubber composition, the appearance and durability of the belt can be improved.

The average thickness of the composite layer is, for example, 0.005 to 0.05 mm, preferably 0.006 to 0.02 mm, and more preferably 0.007 to 0.015 mm (especially, 0.008 to 0.012 mm) or so. When the thickness is too thin, there is a concern that the releasability and breathability are worsened in the belt production process, whereas when the thickness is too thick, there is a concern that the bending resistance is worsened. The average thickness of the composite layer can be measured on the basis of the heat-resistant fiber embedded in the compression rubber layer and can be measured in a manner that an embedded depth at arbitrary 10 places on the bottom part surface of the compression rubber layer is measured, and an average value thereof is determined.

[Compression Rubber Layer]

The compression rubber layer is formed of the same rubber composition as the rubber composition to be contained in the above-described composite layer and may further contain, as a reinforcing fiber, a short fiber, such as a polyamide short fiber, e.g., an aramid short fiber, etc., a polyester short fiber, a vinylon short fiber, etc. The proportion of the reinforcing fiber may be 80 parts by mass or less and is, for example, 1 to 80 parts by mass, preferably 3 to 60 parts by mass, and more preferably 5 to 50 parts by mass (especially, 10 to 45 parts by mass) or so relative to 100 parts by mass of the rubber component. When the proportion of the short fiber is too small, there is a concern that the durability of the belt is worsened.

As for the compression rubber layer, it is preferred that it does not have a nonwoven fabric layer or the like within the layer, and the rubber composition forms a continuous phase. Thus, the rubber component is not divided, so that the durability of the belt can be improved.

The average thickness of the compression rubber layer is, for example, 2 to 20 mm, preferably 2.5 to 15 mm, and more preferably 3 to 10 mm or so.

[Other Layer and Tension Member]

For the adhesive rubber layer, the same rubber composition as in the above-described compression rubber layer (rubber composition containing a rubber component, such as an ethylene-α-olefin elastomer, etc.) can be used. In the rubber composition of the adhesive rubber layer, in many cases, a rubber of the same type or same kind as in the rubber component of the rubber composition of the above-described compression rubber layer is used as the rubber component. In addition, proportions of the additives, such as a vulcanizer or vulcanization aid, a co-crosslinking agent or crosslinking aid, a vulcanization accelerator, etc., can be selected within the same ranges as those in the rubber composition of the above-described compression rubber layer, respectively. The rubber composition of the adhesive rubber layer may further contain an adhesive improver (e.g., a resorcin-formaldehyde cocondensate, an amino resin, etc.). The average thickness of the adhesive rubber layer is, for example, 0.4 to 3 mm, preferably 0.6 to 2 mm, and more preferably 0.8 to 1.5 mm or so.

Though the tension member is not particularly limited, in general, a cord (twisted cord) which is spirally spun in the longitudinal direction of the belt is used. The cords may be embedded in a line at a predetermined interval in parallel to the longitudinal direction of the belt.

As for the cord, high-modulus fibers, for example, a polyester fiber (e.g., a polyalkylene arylate-based fiber), a synthetic fiber, such as an aramid fiber, etc., an inorganic fiber, etc., such as a carbon fiber, etc., are commonly used, and a polyester fiber (e.g., a polyethylene terephthalate-based fiber and a polyethylene naphthalate-based fiber) and an aramid fiber are preferred. The fiber may also be a multifilament yarn, for example, a multifilament yarn having a fineness of 2,000 to 10,000 deniers (especially, 4,000 to 8,000 denier) or so.

As for the cord, in general, a twisted cord formed of a multifilament yarn (for example, double-twist, single-twist, a Lang's lay, etc.) can be used. The average cord diameter of the cord (fiber diameter of the twisted cord) may be, for example, 0.5 to 3 mm, preferably 0.6 to 2 mm, and more preferably 0.7 to 1.5 mm or so.

In order to improve adhesiveness to the polymer component, the cord may be embedded between the tension layer and the compression rubber layer (especially, the adhesive rubber layer) after being subjected to an adhesive treatment of every kind with an epoxy compound, an isocyanate compound, or the like.

In the case where the tension layer is formed of an outside fabric, the outside fabric may be a fabric material, for example, a woven fabric, a wide-angle canvas, a knitted fabric, a nonwoven fabric, etc. (preferably, a woven fabric). In the case where the tension layer is formed of a rubber composition, the rubber composition constituting the tension layer may be formed of a rubber composition that forms the compression rubber layer. The thickness of the tension layer is, for example, 0.8 to 10 mm, preferably 1.2 to 6 mm, and more preferably 1.6 to 5 mm or so.

[V-Ribbed Belt and Production Method Thereof]

The average thickness of the V-ribbed belt of the present invention can be selected within a range of from 2 to 12 mm or so and is, for example, 2.5 to 10 mm, and preferably 3.8 to 5 mm or so, and it may also be, for example, 4.1 to 4.3 mm or so. The average thickness of the rib part can be selected within a range of from 1 to 3.5 mm or so and is, for example, 1.2 to 3 mm, preferably 1.5 to 2.7 mm or so, and more preferably 1.6 to 2 mm or so. The average thickness of the rib part may be 54% or less and is preferably 36 to 53% or so relative to the average thickness of the entire belt.

In the present invention, the composite layer is formed on the bottom part surface of the rib part, and the durability of the belt is excellent, and therefore, the thickness of the rib part can be made thin. For example, when a conventional product has a belt thickness of 4.3±0.3 mm and a rib height of 2.0±0.2 mm, by making the rib height small by 0.2 mm (2.0→1.8 mm), the belt thickness can be reduced to 4.1±0.3 mm. Not only the rib height can be made small, but also the grinding cost (grinding for the bottom part of the rib part) which has hitherto been necessary becomes unnecessary, and therefore, the use amount of the rubber composition constituting the belt can be reduced. In addition, the grinding amount is decreased, and therefore, the grinding time and the grinding dust can also be reduced. Furthermore, the bending properties of the belt are improved in proportion to a decrease of the belt thickness, and therefore, the crack resistance is improved due to stress reduction, and the fuel consumption properties are improved due to reduction of a bending loss.

The production method of the V-ribbed belt of the present invention includes a tension layer attaching step of attaching a tension layer member for forming a tension layer in a cylindrical drum; a cord spinning step of winding a cord as a tension member; a compression rubber layer winding step of winding an unvulcanized rubber sheet for forming a compression rubber layer; a fiber assembly winding step of winding a fiber assembly containing a heat-resistant fiber on the wound vulcanized rubber sheet; a vulcanization step of vulcanizing a belt molded body (unvulcanized belt sleeve) obtained by the above-described respective steps, to obtain a vulcanized belt sleeve; and a grinding step of grinding only a side part of the compression rubber layer on the fiber assembly side of the vulcanized belt sleeve, to achieve molding.

Specifically, in the production method of the present invention, as the tension layer attaching step, a tension layer member is attached on a cylindrical drum. An attaching method of the tension layer member can be selected according to the kind of the tension layer member. In the case of a sheet-shaped member, the tension layer member may be wound around the cylindrical drum, and in the case of an annular member, the tension layer member may be put on the cylindrical drum.

In the present invention, if desired, a pre-step and/or a post-step of the cord spinning step, an adhesive rubber layer attaching step of attaching an adhesive rubber layer may be included. In the case of including the adhesive rubber attaching step as the pre-step, the adhesive rubber layer attaching step may be, for example, a method in which an annular laminate composed of an unvulcanized rubber sheet for forming the adhesive rubber layer and a member for forming the tension layer is put on the cylindrical drum; a method in which a laminate composed of an unvulcanized rubber sheet for forming the adhesive rubber layer and a member for forming the tension layer is wound around the cylindrical drum; a method in which an unvulcanized rubber sheet for forming the adhesive rubber layer is wound on the attached tension layer member; or the like. In the case of including the adhesive rubber attaching step as the post-step, the adhesive rubber layer attaching step may be, for example, a method in which an unvulcanized rubber sheet for forming the adhesive rubber layer is wound on the cord; a method in which a laminate composed of an unvulcanized rubber sheet for forming the adhesive rubber layer and a member for forming the compression rubber layer is wound on the cord; or the like.

Thus, in the above-described cord spinning step, in general, the cord is helically spun and wound on the tension layer member or unvulcanized sheet for adhesive rubber layer which has been attached in the above-described step according to the presence or absence of the adhesive rubber layer winding step. In addition, in the above-described compression rubber layer winding step, in general, the unvulcanized rubber sheet for forming the compression rubber layer (rib rubber layer) is wound on the spun cord or wound unvulcanized sheet for adhesive rubber layer in the above-described step.

Furthermore, in the fiber assembly winding step, the fiber assembly (especially, the nonwoven fabric) containing the heat-resistant fiber which is not melted at a vulcanization temperature of the above-described rubber composition is wound on the surface of the unvulcanized rubber sheet for forming the compression rubber layer. In the case where the above-described heat-resistant fiber is oriented in a predetermined direction, it is preferred to wind the fiber assembly by disposing the longitudinal direction of the heat-resistant fiber in parallel to the longitudinal direction of the belt.

The weight per unit area of the fiber assembly (especially, the nonwoven fabric) before the heat treatment can be selected within a range of from 5 to 50 g/m$^2$ or so and is, for example, 6 to 30 g/m$^2$, preferably 8 to 20 g/m$^2$, and more preferably 8 to 15 g/m$^2$ (especially, 8 to 12 g/m$^2$) or so. The average thickness of the fiber assembly (especially, the nonwoven fabric) before the heat treatment is, for example, 0.02 to 0.15 mm, preferably 0.03 to 0.15 mm, and more preferably 0.03 to 0.1 mm (especially, 0.03 to 0.05 mm) or so. When the weight per unit area or thickness of the fiber assembly is too small, not only there is a concern that the releasability and breathability are worsened in the vulcanization step, but also there is a concern that when the fiber assembly is drawn in molding (winding of the respective members before the vulcanization), the fiber assembly is broken, so that it cannot be wound. On the other hand, when the weight per unit area or thickness of the fiber assembly is too large, the gap between the fibers becomes small, so that there is a concern that the rubber component hardly incorporates among the fibers. In addition, the fiber assembly becomes rigid, so that there is a concern that it becomes difficult to wind the fiber assembly.

In the vulcanization step, a vulcanization method may be a vulcanizer method. The vulcanization temperature can be selected according to the kind of the rubber and may be, for example, 140 to 200° C., preferably 150 to 180° C., and more preferably 165 to 180° C. or so. When the vulcanization temperature is too low, there is a concern that the rubber composition is hardly impregnated among the fibers of the fiber assembly, whereas when it is too high, there is a concern that the fiber shape vanishes. In the present invention, the fiber assembly and the rubber composition positioning on the bottom part surface of the compression rubber layer are integrated with each other by the vulcanization step (the rubber composition is impregnated among the fibers of the fiber assembly), and therefore, the adhesive treatment of the fiber assembly is not needed, and the productivity is also high. In addition, at the time of vulcanization, the fiber assembly is embedded in the compression rubber layer while holding the form of the fiber to some extent, and therefore, such is also effective for air bleeding at the time of vulcanization or release from the vulcanizing jacket.

In the grinding step, in general, the vulcanized belt sleeve is ground to form ribs in the compression rubber layer and then cut into round slices in a predetermined width, thereby obtaining the V-ribbed belt. As for the grinding method, a customary method can be utilized. Only a side part of the compression rubber layer is ground on the fiber assembly side of the compression rubber layer, and therefore, the composite layer is formed on the bottom part surface, and the grinding amount can be also reduced.

Examples

The present invention is hereunder described in more detail based on Examples, but it should be construed that the present invention is by no means limited by these Examples. The details of nonwoven fabrics, components of rubber compositions, and tension members (cords) used in the Examples as well as the evaluation methods of evaluation items as measured are shown below.

[Nonwoven Fabric]
(Polyethylene terephthalate (PET) nonwoven fabrics of Examples 1 to 5: manufactured by Hirose Paper Mfg Co., Ltd., melting point 260° C., heat fusion point: no)

Example 1

Trade name "05TH-8", weight per unit area 8 g/m$^2$, thickness 0.03 mm

Example 2

Trade name "05TH-12", weight per unit area 12 g/m$^2$, thickness 0.04 mm

Example 3

Trade name "05TH-15", weight per unit area 15 g/m$^2$, thickness 0.04 mm

Example 4

Trade name "05TH-20", weight per unit area 20 g/m$^2$, thickness 0.07 mm

Example 5

Trade name "05TH-20H", weight per unit area 20 g/m$^2$, thickness 0.05 mm
(Polyethylene terephthalate (PET) nonwoven fabric of Example 6: manufactured by Toyobo Co., Ltd., melting point 260° C., heat fusion point: yes)

Example 6

Trade name "3151AD", weight per unit area 15 g/m², thickness 0.12 mm (Nonwoven Fabrics of Comparative Examples)

Comparative Example 1

Rayon nonwoven fabric, manufactured by Shinwa Corporation, trade name "#5130", weight per unit area 30 g/m², thickness 0.4 mm, melting point (softening point): no

Comparative Examples 2 and 3

Low density polyethylene (PE) nonwoven fabric, manufactured by Idemitsu Unitech Co., Ltd., trade name "Stratech LL", weight per unit area 30 g/m², thickness 0.3 mm, melting point 130° C.

Comparative Example 4

Polypropylene (PP) nonwoven fabric, manufactured by Asahi Kasei Fibers Corporation, trade name "PL2020", weight per unit area 15 g/m², thickness 0.14 mm, melting point 165° C. heat fusion point: yes

Comparative Example 5

Polypropylene (PP) nonwoven fabric, manufactured by Idemitsu Unitech Co., Ltd., trade name "Stratech RN2030", weight per unit area 30 g/m², thickness 0.24 mm, melting point 165° C., heat fusion point: yes

[Components of Rubber Composition]

EPDM polymer: "IP3640", manufactured by DuPont Dow Elastomers Japan K.K., Mooney viscosity 40 (at 100° C.)

Polyamide short fiber: "66 Nylon", manufactured by Asahi Kasei Corporation

Carbon black HAF: "Seast 3", manufactured by Tokai Carbon Co., Ltd.

Paraffin-based softening agent: "Diana Process Oil", manufactured by Idemitsu Kosan Co., Ltd.

Organic peroxide: "Perkadox 14RP", manufactured by Kayaku Akzo Corporation

Hydrated silica: "Nipsil VN3", manufactured by Tosoh Silica Corporation, specific surface area 240 m²/g Anti-aging agent: "Nonflex OD3", manufactured by Seiko Chemical Co., Ltd.

Vulcanization accelerator DM: Di-2-benzothiazolyl disulfide

[Tension Member (Cord)]

Cord: Fibers produced by double-twisting 1,000 denier PET fibers in a twisting mode of 2×3 at a final twist coefficient of 3.0 and a primary twist coefficient of 3.0, and subjecting the obtained cord having a total denier of 6.000 to adhesion treatment.

[Releasability Against Vulcanizing Jacket]

In the production of the belt in the Examples and Comparative Examples, the state of the vulcanized belt sleeve from which the vulcanizing jacket had been removed was observed and evaluated according to the following criteria.

A: The outer peripheral surface of the vulcanized belt sleeve (corresponding to the surface of the bottom part of the compression rubber layer) does not stick to the vulcanizing jacket and can be readily released.

B: The outer peripheral surface of the vulcanized belt sleeve sticks to the vulcanizing jacket and is hardly released (a tool is necessary). A twist pattern is formed on the surface, so that the appearance is inferior.

[Heat Resistance and Durability]

A running test machine used for a test of heat resistance and durability is configured to dispose a drive pulley (diameter 120 mm), an idler pulley (diameter 85 mm), a driven pulley (diameter 120 mm), and a tension pulley (diameter 45 mm). A V-ribbed belt was suspended on the respective pulleys such that a winding angle to the tension pulley was 90°, and a winding angle to the idler pulley was 120°, and the V-ribbed belt was run under a condition at an ambient temperature of 120° C. and a rotation number of the drive pulley of 4,900 rpm. At this time, a load was imparted to the drive pulley such that a belt tension was 40 kgf/rib, and a load of 8.8 kW was given to the driven pulley. Then, the V-ribbed belt was run in this way, and a time until 6 cracks reaching the cord occur was measured.

[Bending Fatigue Resistance (Crack Resistance)]

Figure 2:
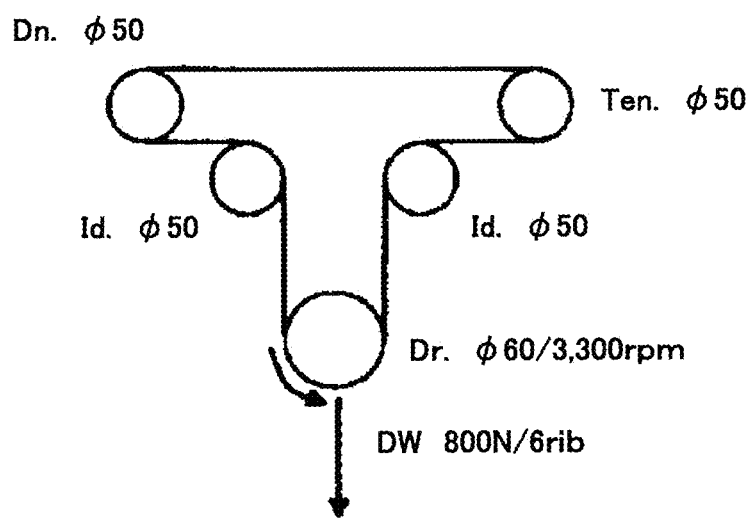
FIG. 2 is a layout of a testing machine used for a bending fatigue resistance (crack resistance) test in the Examples.

Using a testing machine having a layout shown in FIG. 2, a running test of the V-ribbed belt obtained in each of the Examples and Comparative Examples was conducted in an atmosphere at 130° C., and a time until a crack occurs in the rib part was measured, thereby evaluating the bending fatigue resistance. The measurement was conducted two or more times, except for Comparative Example 1, and an average value and a scattering (difference between a maximum value and a minimum value) were calculated.

[Evaluation of Appearance Properties]

A rib tip surface of the V-ribbed belt obtained in each of the Examples and Comparative Examples was visually observed and evaluated according to the following criteria.

4: In the rib tip surface, fuzz of the fiber of the nonwoven fabric or a lump of the skin layer is not observed.

3: In a part of the rib tip surface, though fuzz of the fiber of the nonwoven fabric or a lump of the skin layer is slightly observed, such is not noticeable.

2: In the rib tip surface, fuzz of the fiber of the nonwoven fabric or a lump of the skin layer is observed, and such is somewhat noticeable.

1: Fuzz of the fiber of the nonwoven fabric or a lump of the skin layer is observed in the entire rib tip surface.

The term "fuzz" in the evaluation criteria means that the rib tip surface contains a filamentous material of the following state (1) or (2).

(1) A state where the filamentous material in which the fiber shape of the nonwoven fabric is held is not fully embedded in the rubber but appears on the bottom part surface.

(2) A state where in grinding the side part, the filamentous material embedded in the bottom part (composite layer), in which the fiber shape is held, is drawn out from the composite layer due to an influence of a grinder and appears out of the surface.

Examples 1 to 6 and Comparative Examples 1 to 5

(Outside Fabric for Forming Tension Layer)

A wide-angle plain weave canvas (thickness 0.63 mm) formed of a blended twist yarn of a cotton fiber and a polyethylene terephthalate fiber in a weight ratio of 50:50 was used as an outside fabric. Such a canvas was immersed in an RFL liquid and then heat treated at 150° C. for 2 minutes, thereby preparing an adhesive-treated canvas. Furthermore, a laminate in which a rubber sheet (thickness 0.5 mm) for forming an adhesive rubber layer obtained from a rubber composition shown in Table 1 was laminated on this adhesive-treated canvas was prepared.

(Rubber Sheet for Forming Compression Rubber Layer and Adhesive Rubber Layer)

The rubber composition shown in Table 1 was kneaded with a Banbury mixer and rolled by calendar rolls, thereby preparing a rubber sheet for forming the compression rubber layer in a thickness of 2.2 mm and a rubber sheet for forming the adhesive rubber layer in a thickness of 0.5 mm, respectively.

TABLE 1

|  | Compression rubber layer (parts by mass) | Adhesive rubber layer (parts by mass) |
|---|---|---|
| EPDM polymer | 100 | 100 |
| Polyamide short fiber | 15 | — |
| Cotton short fiber | 25 | — |
| Zinc oxide ZnO | 5 | 5 |
| Stearic acid | 1 | 1 |
| Mercapto benzimidazole | 1 | — |
| Carbon black HAF | 60 | 35 |
| Paraffin-based softening agent | 10 | — |
| Organic peroxide | 4 | — |
| Dibenzoyl quinone dioxime | 2 | — |
| Hydrated silica | — | 20 |
| Resorcin/formalin copolymer | — | 2 |
| Anti-aging agent | — | 2 |
| Vulcanization accelerator DM | — | 2 |
| Hexamethoxy methylolmelamine | — | — |
| Sulfur | — | 1 |

(Production of Belt)

A laminate prepared by laminating an outside fabric for forming the tension layer and a rubber sheet for forming the adhesive rubber layer was wound around the outer periphery of a cylindrical drum (molding die) having a smooth surface such that the rubber sheet for forming the adhesive rubber layer became an outer peripheral surface. A cord was spirally wound around the outer peripheral surface of this laminate. Thereafter, on this cord, a laminate prepared by laminating a rubber sheet for forming the adhesive rubber layer and a rubber sheet for forming the compression rubber layer was further wound such that the rubber sheet for forming the compression rubber layer became the outermost peripheral surface. Furthermore, a nonwoven fabric was wound on this outermost peripheral surface, thereby preparing a belt molded body in an unvulcanized state (unvulcanized belt sleeve).

Furthermore, the belt molded body was disposed within a vulcanizer in a state where the vulcanizing jacket was put on the outer periphery side of the belt molded body, followed by undergoing vulcanization with pressurized steam under a condition at 180° C. and 0.9 MPa for 25 minutes.

Furthermore, after cooling, in the vulcanized belt sleeve obtained by removing (releasing) the vulcanizing jacket, only the side part of the compression rubber layer was ground by a grinding wheel (grinding stone) having a predetermined shape for forming a groove having a V-shaped section, thereby forming a plurality of ribs (grooves having a V-shaped section). This vulcanized belt sleeve having a plurality of ribs formed therein was cut in a predetermined width by a cutter such that it was cut into round slices, and the inner periphery side and the outer periphery side were reversed to obtain a V-ribbed belt having the cross-sectional structure shown in FIG. 1.

Figure 3:
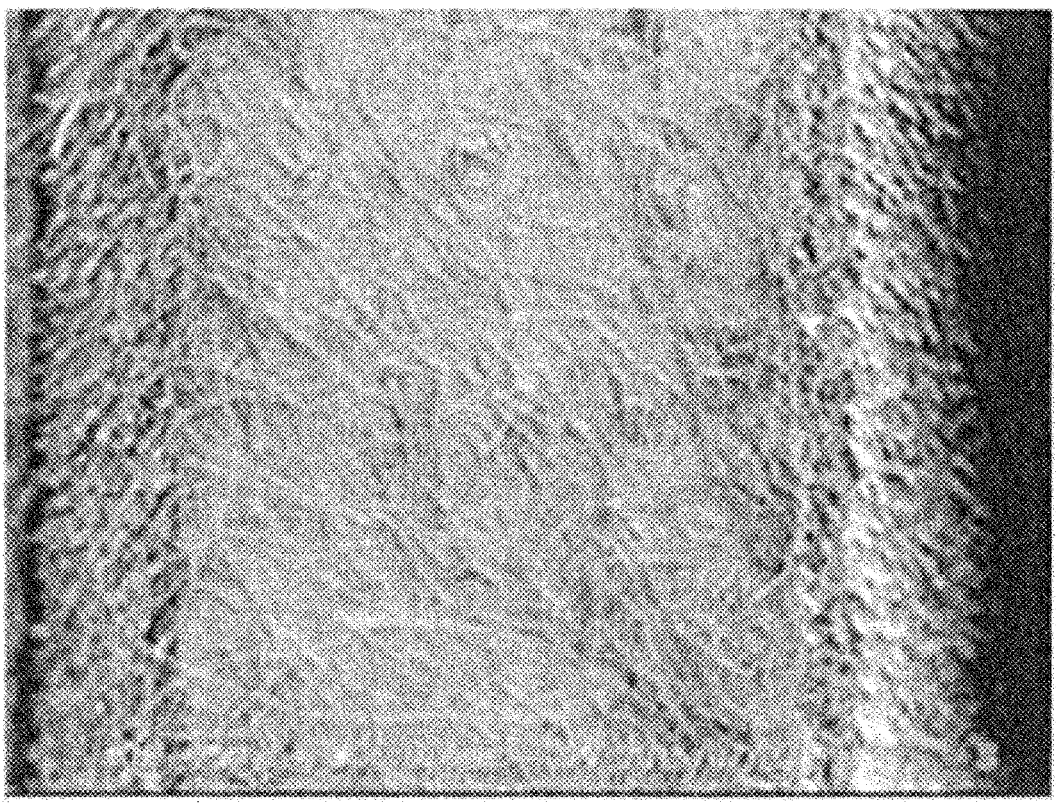
FIG. 3 is a surface electron microscopic photograph of a composite layer of a V-ribbed belt obtained in Example 1.

In the rib part surface of the V-ribbed belt obtained in each of the Examples, the nonwoven fabric was embedded in the compression rubber layer in a state where a part of the fiber was exposed out of the surface thereof to form the composite layer. A scanning electron microscopic photograph (SEM photograph) of the rib part surface of the V-ribbed belt obtained in Example 1 is shown in FIG. 3. In FIG. 3, thin linear portions are a portion originated in the nonwoven fabric, and other portions are a portion originated in the compression rubber layer. As is clear from FIG. 3, in the rib part surface of the V-ribbed belt of Example 1, a composite layer having the nonwoven fabric and the rubber composition included therein was formed. In detail, with respect to FIG. 3, a central portion where a fibrous part can be observed is the bottom part surface (non-ground surface), and the right and left ends are a ground surface.

With respect to Comparative Example 3, a V-ribbed belt was produced by the method using a die described in the Examples of JP-A-2013-145032.

(Evaluation of Belt)

The evaluation results of the prepared V-ribbed belts regarding the heat resistance and durability, the bending fatigue resistance, and the appearance of rib part surface are shown in Table 2.

TABLE 2

| | Examples | | | | | |
|---|---|---|---|---|---|---|
| Item | 1 | 2 | 3 | 4 | 5 | 6 |
| Forming method of rib | Grinding | Grinding | Grinding | Grinding | Grinding | Grinding |
| Site to be covered by nonwoven fabric | Bottom part | Bottom part | Bottom part | Bottom part | Bottom part | Bottom part |
| Melting point of nonwoven fabric (° C.) | 260 | 260 | 260 | 260 | 260 | 260 |
| Material of nonwoven fabric | PET | PET | PET | PET | PET | PET |
| Weight per unit area of nonwoven fabric (g/m$^2$) | 8 | 12 | 15 | 20 | 20 | 15 |
| Thickness of nonwoven fabric (mm) | 0.03 | 0.04 | 0.04 | 0.07 | 0.05 | 0.12 |
| Presence or absence of heat fusion point | No | No | No | No | No | Yes |
| Releasability against vulcanizing jacket | A | A | A | A | A | A |
| Belt thickness (mm) | 4.1 | 4.1 | 4.1 | 4.1 | 4.1 | 4.1 |
| Heat resistance and durability (hr) | 590 | 580 | 600 | 570 | 580 | 550 |
| Average thickness of composite layer after vulcanization (mm) | 0.008 | 0.015 | 0.018 | 0.026 | 0.031 | 0.040 |

TABLE 2-continued

| | | | | | | |
|---|---|---|---|---|---|---|
| Average diameter of heat-resistant fiber after vulcanization (μm) | 5 | 5 | 5 | 5 | 5 | 9 |
| Bending fatigue resistance (hr) Average value | 185 | 180 | 170 | 160 | 145 | 120 |
| Bending fatigue resistance (hr) Scattering | 5 | 30 | 15 | 30 | 25 | 25 |
| Appearance | 4 | 4 | 3 | 3 | 3 | 3 |

| | Comparative Examples | | | | |
|---|---|---|---|---|---|
| Item | 1 | 2 | 3 | 4 | 5 |
| Forming method of rib | Grinding | Grinding | Die molding | Grinding | Grinding |
| Site to be covered by nonwoven fabric | Bottom part | Bottom part | Side part and bottom part | Bottom part | Bottom part |
| Melting point of nonwoven fabric (° C.) | — | 130 | 130 | 165 | 165 |
| Material of nonwoven fabric | Rayon | PE | PE | PP | PP |
| Weight per unit area of nonwoven fabric (g/m$^2$) | 30 | 30 | 30 | 15 | 30 |
| Thickness of nonwoven fabric (mm) | 0.40 | 0.30 | 0.30 | 0.14 | 0.24 |
| Presence or absence of heat fusion point | No | Yes | Yes | Yes | Yes |
| Releasability against vulcanizing jacket | A | B | B | B | B |
| Belt thickness (mm) | 4.1 | 4.1 | 4.3 | 4.1 | 4.1 |
| Heat resistance and durability (hr) | 260 | 540 | 510 | 600 | 530 |
| Average thickness of composite layer after vulcanization (mm) | 0.24 | 0.20 | 0.20 | 0.09 | 0.18 |
| Average diameter of heat-resistant fiber after vulcanization (μm) | 7 | 15 | 15 | 40 | 15 |
| Bending fatigue resistance (hr) Average value | 80 | 100 | 95 | 190 | 150 |
| Bending fatigue resistance (hr) Scattering | — | 55 | 60 | 80 | 70 |
| Appearance | 1 | 4 | 4 | 3 | 2 |

As is clear from Table 2, when Examples 1 to 6 in which the bottom part of the compression rubber layer formed a composite layer having the rubber composition impregnated among the fibers of the nonwoven fabric are compared with Comparative Examples 2 and 3 in which the nonwoven fabric was melted to vanish the fiber shape, whereby a single film-like resin layer (skin layer) was formed. Examples 1 to 6 were long in the time until the crack occurs in both the heat resistance and durability and the bending fatigue resistance and excellent in the durability.

In addition, in Comparative Examples 4 and 5 using a polypropylene nonwoven fabric, the heat treated material of the nonwoven fabric is formed of a fibrous part in which the fiber shape remains and a non-fibrous part in which the fiber shape vanishes. Thus, the composite layer forms a structure where three components of the fibrous part, the non-fibrous part, and the rubber component are included. Due to the remaining fiber shape, the heat resistance and durability and the bending fatigue resistance are equal to those in Examples 1 to 6 using the PET nonwoven fabric. However, in the belts containing a molten material of the fibrous part (Comparative Examples 2 to 5), the releasability from the vulcanizing jacket after vulcanization was inferior. Furthermore, the scattering of the test results of the bending fatigue resistance is so large that the stability is not obtained, and therefore the belts of Comparative Examples 2 to 5 were a lack of practicality.

In addition, when Examples 1 to 6 are compared with Comparative Example 1 in which the nonwoven fiber remains in a fiber shape similar to Examples 1 to 6, Examples 1 to 6 were more excellent in the durability than Comparative Example 1.

In the light of the above, in the Examples in which the surface of the bottom part of the compression rubber layer is the composite layer in which the rubber composition is impregnated among the fibers of the PET nonwoven fabric, the belt was readily bent and excellent in the durability, as compared with the Comparative Examples in which the surface of the bottom part of the compression rubber layer is a film-like resin layer (skin layer) or a thick nonwoven fabric. In addition, as compared with the Comparative Examples in which the surface of the bottom part of the compression rubber layer is a molten material of the nonwoven fabric in which the fiber shape remains, the Examples were excellent in the releasability from the vulcanizing jacket.

In addition, among the Examples, in the nonwoven fabrics having a smaller weight per unit area and a smaller thickness, the time until the crack occurs became longer in the bending fatigue resistance test.

Furthermore, with respect to the nonwoven fabrics having the same weight per unit area, when Example 3 having no heat fusion point is compared with Example 6 having a heat fusion point, Examples 3 was more excellent in the durability. It may be estimated that this is because when the nonwoven fabric has a heat fusion point, the nonwoven fabric became thick, resulting in worsening of the bending properties. In addition, it may also be estimated that it is concerned that a stress is concentrated into the heat fusion point at the time of bending, so that the crack is liable to occur.

With respect to the appearance, as compared with the belt of Comparative Example 1 in which fuzz of the nonwoven fabric on the entire bottom part surface of the compression rubber layer was raising, the belts of Examples 1 to 6 were free or not noticeable regarding fuzz of the nonwoven fabric, and good in the appearance.

Figure 4:
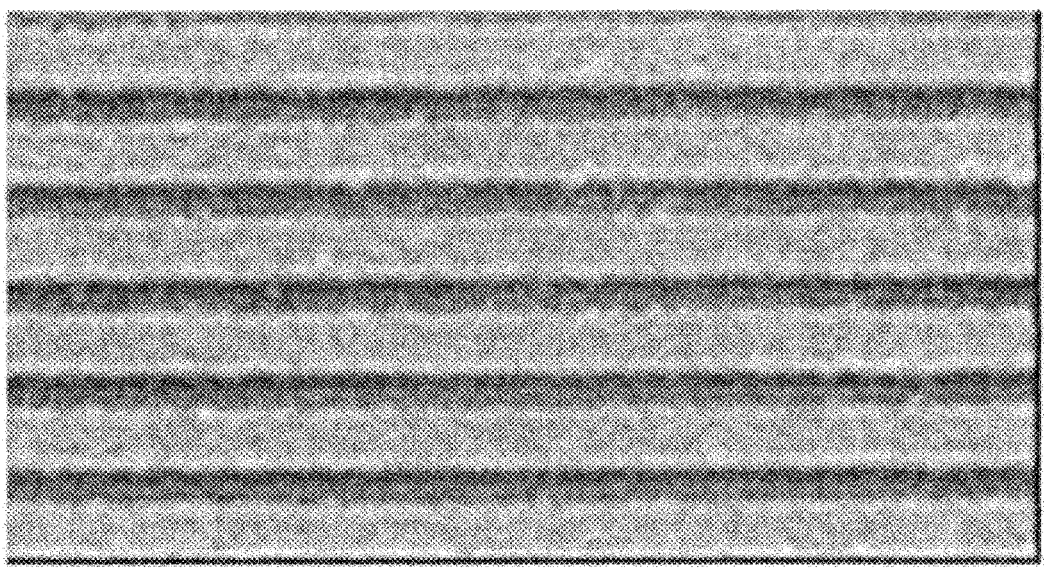
FIG. 4 is a photograph of a rib part of a V-ribbed belt obtained in Example 1.

FIG. 4 shows a photograph of the rib part of the V-ribbed belt obtained in Example 1, in which a flaw or a stain was not transferred from the vulcanizing jacket, and the appearance was good. That is, though the nonwoven fabric can be observed in the SEM photograph, the nonwoven fabric was not noticeable through visual inspection.

Figure 5:
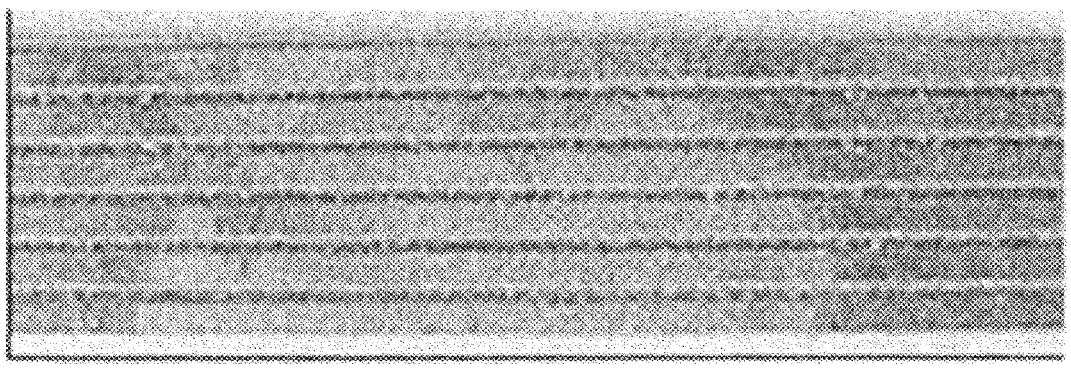
FIG. 5 is a photograph of a rib part of a V-ribbed belt obtained in Reference Example 1.

FIG. 5 shows a photograph of a rib part of a V-ribbed belt produced without using a nonwoven fabric (Reference Example 1). A flaw or a stain was transferred from the vulcanizing jacket.

While the present invention has been described in detail and with reference to specific embodiments thereof, it will be apparent to one skilled in the art that various changes and modifications can be made therein without departing from the spirit and scope thereof.

The present application is based on Japanese Patent Application No. 2015-191401, filed on Sep. 29, 2015 and Japanese Patent Application No. 2016-175415, filed on Sep. 8, 2016, the entireties of which are incorporated by reference.

INDUSTRIAL APPLICABILITY

The V-ribbed belt of the present invention can be utilized as a friction transmission belt of a transmission device for drive of automobile engine auxiliary machines and so on.

DESCRIPTION OF REFERENCE NUMERALS AND SIGNS

1: Tension layer
2: Tension member (cord)
3: Adhesive rubber layer
4: Compression rubber layer
4a: Ground surface
5: Composite layer

The invention claimed is:

1. A V-ribbed belt comprising:
a compression rubber layer containing a vulcanizate of a rubber composition, and having a side part being a ground surface coming into contact with pulleys and a bottom part being a non-ground surface not coming into contact with pulleys;
a tension member;
a tension layer; and,
a composite layer, on a surface of the bottom part, containing a fiber assembly that contains a heat-resistant fiber which is not melted at a vulcanization temperature of the rubber composition, and that has a weight per unit area of 8 to 20 g/m$^2$, and a vulcanizate of the rubber composition impregnated among fibers of the fiber assembly,
wherein the heat-resistant fiber contains a long fiber,
wherein the compression rubber layer forms a continuous phase with the vulcanizate of the rubber composition.

2. The V-ribbed belt according to claim 1, wherein the heat-resistant fiber contains a polyester fiber.

3. The V-ribbed belt according to claim 1, wherein the fiber assembly has a nonwoven fiber structure.

4. The V-ribbed belt according to claim 1, wherein the heat-resistant fiber has an average fiber diameter of 1 to 50 µm.

5. The V-ribbed belt according to claim 1, wherein the heat-resistant fibers are not fused with each other.

6. The V-ribbed belt according to claim 1, wherein the compression rubber layer contains a short fiber.

7. The V-ribbed belt according to claim 1, wherein the fiber assembly has a nonwoven fiber structure, the heat-resistant fiber is oriented in a predetermined direction, and a longitudinal direction of the heat-resistant fiber is in parallel to a longitudinal direction of the belt.

8. The V-ribbed belt according to claim 1, wherein the compression rubber layer has a rib part, and the rib part has an average thickness of 54% or less relative to an average thickness of the entire V-ribbed belt.

9. A production method of the V-ribbed belt according to claim 1, the method comprising:
attaching a tension layer member for forming a tension layer in a cylindrical drum;
winding a cord as a tension member;
winding an unvulcanized rubber sheet for forming a compression rubber layer;
winding a fiber assembly containing a heat-resistant fiber on the wound unvulcanized rubber sheet;
vulcanizing a belt molded body obtained by the attaching, winding the cord, winding the unvulcanized rubber sheet, and winding the fiber assembly to obtain a vulcanized belt sleeve; and
grinding only a side part of the compression rubber layer on a fiber assembly side of the vulcanized belt sleeve to achieve molding.

10. The production method according to claim 9, wherein the fiber assembly has an average thickness of 0.03 to 0.15 mm.

* * * * *